June 5, 1945.   J. A. CHURCHILL   2,377,537
VALVE FOR CONTROLLING THE FLOW OF LIQUIDS
Filed March 30, 1943
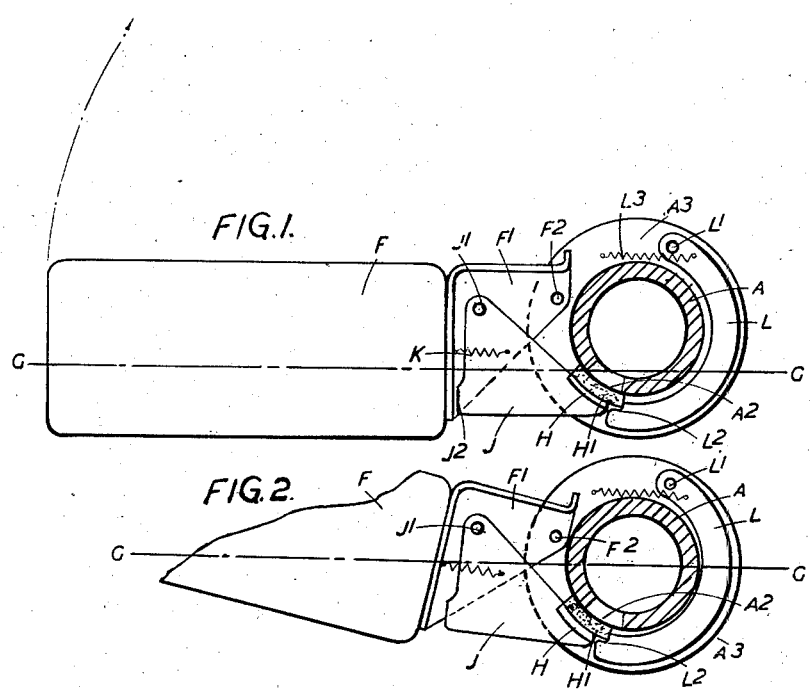
John Adrian Churchill,
Inventor
By Emery, Holcombe
and Blair
Attorneys Patented June 5, 1945

2,377,537

UNITED STATES PATENT OFFICE 2,377,537

VALVE FOR CONTROLLING THE FLOW OF LIQUIDS

John Adrian Churchill, Luton, England, assignor to D. Napier & Son Limited, London, England, a company of Great Britain Application March 30, 1943, Serial No. 481,139
In Great Britain March 30, 1942

3 Claims. (Cl. 137—104)

This invention relates to valves for controlling the flow of liquids and particularly the outflow of a liquid from a tank. It is more especially intended for use in tanks, containing for example petrol, the liquid being drawn thence through a suction pipe which is common to all of a series of tanks. The object of the invention is to control the outflow from each tank in such a way that air will not be drawn into the suction pipe when the level of the liquid in any one of the tanks falls to a point at which there will be risk of air entering the suction system.

According to this invention there is provided a valve adapted to close the orifice of the tank outlet and a float which will automatically effect this closure as and when the level of the liquid in the tank falls to a determined point at which air will tend to be drawn into the outlet, the float automatically moving the valve and uncovering the orifice when the level of the liquid again rises. The closing of the tank outlet may be effected by a main valve and a secondary valve, the latter closing an orifice which is smaller than the orifice of the main outlet which is controlled by the main valve. The float causes the valves to close both orifices when the level of the liquid falls to the determined point, but when the level of the liquid again rises the float will automatically move first the valve from the secondary orifice and thereby reduce the suction behind the main valve which can then be moved by the float without difficulty so as to permit again the free flow of the liquid through the outlet. It is desirable to provide means whereby the valve when it has closed the outlet orifice is locked to prevent it from being moved and lifted by back pressure in the outlet pipe, the valve in that case being released automatically when it is moved by the float as the level of the liquid rises.

The movement imparted to the valve by the float may be about a hinge or pivot situated at one side of the outlet orifice the valve being thus of the flap type. Preferably, however, the valve is mounted on the end of a pivoted arm whose pivot is movable as the float moves, the arrangement causing the valve to move radially on to and close the outlet orifice as the float falls with the level of the liquid, but as the float again rises its movement will impart a lateral sliding movement to the valve as it is withdrawn from the orifice, thus giving a gradual opening of the outlet.

By employing the invention, more particularly where there are a series of separate tanks from which liquid such as petrol is drawn through a common outlet, it is no longer necessary to draw from each tank in succession, which involves watching for the emptying of each tank and then shutting off the one tank and opening connection to the next one. All tanks can now be drawn from simultaneously and it is possible to dispense with non-return valves as commonly provided in the pipe lines leading to the several tanks. If one tank has been punctured some loss of fuel therefrom may be automatically prevented. With the flow from all tanks switched on it is possible say for an engine to run, until all tanks are empty and each tank as it is about to become empty will be automatically cut out and air will not tend to be drawn into the suction system as the liquid continues to be drawn from the other tanks.

The accompanying drawing illustrates by way of example one construction which may be employed in carrying the invention into practice. In the drawing:

Figure 1 shows a side elevation of one construction, the end of the draw-off pipe being seen in cross-section and the valve and float in side elevation, the parts being in the positions assumed when the level of the liquid has fallen and the float has caused the valve to close the outlet orifice.

Figure 2 is a view similar to Figure 1, but showing the lateral withdrawal of the valve from over the orifice in the pipe as the level of the liquid rises and the float lifts with it.

Turning to the construction shown in the drawing, it will be seen that the outlet orifice of the pipe A is constituted by a lateral port $A^2$ in the wall of the pipe whose end in this case is closed off. On the pipe A near this port is formed an annular flange $A^3$. Projecting from the bottom of the float F is a lug or plate $F^1$ which is pivoted at $F^2$ on the flange $A^3$, the position of this pivot being above the port $A^2$ which is placed in the under side of the wall of the pipe A. The valve by which this port is closed is formed as a plate H faced with suitable material $H^1$ and carried on an arm J shaped as a triangular plate and pivoted at $J^1$ on the lug $F^1$ on the bottom of the float. A spring K which extends between the bottom of the float and a suitable point on the plate J tends to keep a part $J^2$ of this plate in contact with the bottom of the float. A curved arm L lies against and is pivoted at one end at $L^1$ to the pipe flange $A^3$ the free end of this arm having an undercut or hook form as at $L^2$ adapted to engage the edge of the valve H H¹ in the manner seen in Figure 1. This serves to lock the valve when it has closed the port A² so that any back pressure which may be set up in the outlet pipe A cannot lift the valve which can only be moved to uncover the port when the float is caused to rise. A spring L³ extends between a point on the flange A³ and a suitable point on the arm L and tends to keep the latter in position for its end to engage the valve H H¹. This valve acts in effect as a non-return valve when the tank is empty and hence the non-return valves which are commonly inserted in the pipe lines in certain installations can be omitted. It will be seen that the valve is free to be brought fully on to its seat over the port A² when the float F has fallen to the requisite extent following the lowering of the level of the liquid. If the level of this liquid rises again and lifts the float, then as the latter turns about its pivot F² it will draw the valve H H¹ laterally off the port with a sliding movement thus uncovering the port gradually. This action on the valve through the arm J has the effect of increasing the leverage of the float and enables it to overcome the suction in the pipe A so that in practice it becomes possible to use a float having comparatively small buoyancy. The action on the valve as the float rises is shown in Figure 2 where the valve is seen as partly drawn from over the port A² following a rise in the level G—G of the liquid. It will be noted that owing to a limited swinging movement allowed to the curved arm L the hooked end of this arm is still in engagement with the edge of the valve H H¹ and this engagement will be maintained until the float has been lifted further and has drawn the valve laterally to a further extent.

What I claim as my invention and desire to secure by Letters Patent is:

1. In a valve assembly for controlling outflow from a body of liquid through a pipe which has an outlet orifice; a float hinged to the pipe so that as the level of the liquid falls and rises the float will turn about its hinge, a valve adapted to close the orifice in the pipe, means whereby when the valve has closed the orifice it will be automatically locked against unclosing by back pressure in the pipe, a connection between the float and the valve such that as the float turns about its hinge it will move the valve and cause it to close the orifice as the float falls owing to a fall in the liquid level and subsequently to open the orifice when the level of the liquid again rises, and means whereby when the float is lifted by rising of the liquid level it will automatically release the said valve-locking means as the valve is moved, said last mentioned means comprising a spring engaged detent adapted to hold said valve adjacent the orifice until said valve is moved out of locking engagement therewith by reverse rotation of the float about its hinge effecting a relatively sliding movement of the valve with respect to the orifice and detent.

2. In a valve assembly for controlling outflow from a body of liquid through an outlet orifice near the bottom of the said body; a valve adapted to close the orifice by a vertical movement, a float operatively connected to the valve so as to close the orifice when the liquid level falls to a predetermined point, means whereby when the valve has thus closed the orifice it will be automatically locked and thereby prevented from being lifted from the orifice by back pressure through the orifice, and means whereby when the level of the liquid again rises and lifts the float it will automatically release the locking means and move the valve and thereby open the orifice, said last mentioned means comprising a detent adapted to preclude vertical movement of said valve with respect to said orifice prior to a predetermined lateral movement thereof with respect thereto.

3. In a valve assembly for controlling outflow from a body of liquid through an outlet orifice near the bottom of the body; a valve movable to close the orifice, a float operatively connected to the valve to move it to close the orifice when the level of the liquid falls to a predetermined point, means whereby when the valve has been closed it will be automatically locked against being opened by back pressure through the orifice, and means whereby when the level of the liquid again rises and lifts the float it will automatically release the locking means and move the valve to open the orifice, said last mentioned means comprising a spring held detent releasable only upon a predetermined movement of said float effecting a predetermined movement of said valve in a direction different from that in which said valve would be moved by back pressure.

JOHN ADRIAN CHURCHILL.